United States Patent
Tucker et al.

(10) Patent No.: US 11,230,501 B1
(45) Date of Patent: Jan. 25, 2022

(54) METHOD OF FABRICATING HIGH-PERMITTIVITY DIELECTRIC MATERIAL

(71) Applicant: United States of America as represented by the Administrator of NASA, Washington, DC (US)

(72) Inventors: Dennis S. Tucker, Idaho Falls, ID (US); Terry D. Rolin, Elkmont, AL (US); Curtis W. Hill, Meridianville, AL (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 17/163,709

(22) Filed: Feb. 1, 2021

Related U.S. Application Data

(63) Continuation-in-part of application No. 15/940,143, filed on Mar. 29, 2018, now abandoned.

(51) Int. Cl.
*C04B 35/468* (2006.01)
*C04B 35/628* (2006.01)
(Continued)

(52) U.S. Cl.
CPC ...... *C04B 35/468* (2013.01); *C04B 35/62807* (2013.01); *C04B 35/62884* (2013.01); *C04B 35/64* (2013.01); *H01G 4/12* (2013.01); *B82Y 40/00* (2013.01); *C04B 2235/3236* (2013.01); *C04B 2235/5454* (2013.01); *C04B 2235/6562* (2013.01); *C04B 2235/6565* (2013.01);
(Continued)

(58) Field of Classification Search
CPC . C04B 35/468; C04B 35/62884; C04B 35/64; C04B 35/62807; C04B 2235/6562; C04B 2235/6567; C04B 2235/96; C04B 2235/6581; C04B 2235/5454; C04B 2235/666; C04B 2235/6565; C04B 2235/3236; B82Y 50/00; H01G 4/12
See application file for complete search history.

(56) References Cited

U.S. PATENT DOCUMENTS 5,990,028 A 11/1999 Roethlingshoefer et al.
6,268,054 B1 7/2001 Costantino et al.
(Continued)

OTHER PUBLICATIONS

University of Cambridge, "Barium Titanate and Phase Changes", 2006, (Year: 2006).*

*Primary Examiner* — Michael M. Robinson
*Assistant Examiner* — Victoria Bartlett
(74) *Attorney, Agent, or Firm* — James J. McGroary; Helen M. Galus

(57) ABSTRACT

Nano-sized particles of barium-titanate are heated as a gas mixture of 25% hydrogen and 75% nitrogen is passed there through yielding particles of barium-titanate having oxygen vacancies therein. The particles of barium-titanate having oxygen vacancies therein are coated with silica yielding silica-coated particles having a silica coating thickness in a range of 2-5 nanometers. The silica-coated particles are sintered by application of pressure in a range of 35-50 megapascals and temperature in a range of 950-1050° C. The sintered quantity of material is cooled at a cooling rate in a range of 1-3° C. per minute at least until the temperature thereof is less than 120° C.

18 Claims, 5 Drawing Sheets

(51) Int. Cl.
    *C04B 35/64*          (2006.01)
    *H01G 4/12*           (2006.01)
    *B82Y 40/00*          (2011.01)

(52) U.S. Cl.
    CPC ............... *C04B 2235/6567* (2013.01); *C04B 2235/6581* (2013.01); *C04B 2235/666* (2013.01); *C04B 2235/96* (2013.01)

(56) References Cited

U.S. PATENT DOCUMENTS

| | | | |
|---|---|---|---|
| 6,905,649 B2 * | 6/2005 | Zhan | B82Y 30/00 |
| | | | 264/434 |
| 7,033,406 B2 | 4/2006 | Weir et al. | |
| 7,466,536 B1 | 12/2008 | Weir et al. | |
| 7,595,109 B2 | 9/2009 | Weir et al. | |
| 7,939,007 B2 | 5/2011 | Guillemet et al. | |
| 2016/0325353 A1 * | 11/2016 | Walker | B22F 3/14 |
| 2017/0022608 A1 * | 1/2017 | King | H01G 4/1227 |
| 2017/0221648 A1 * | 8/2017 | Rolin | C04B 35/6262 |
| 2018/0311729 A1 * | 11/2018 | Allemand | C23C 16/325 |

\* cited by examiner

METHOD OF FABRICATING HIGH-PERMITTIVITY DIELECTRIC MATERIAL This is a continuation-in-part of application Ser. No. 15/940,143, filed Mar. 29, 2018.

ORIGIN OF THE INVENTION

The invention described herein was made in the performance of work under a NASA contract and by an employee of the United States Government and is subject to the provisions of Public Law 96-517 (35 U.S.C. § 202) and may be manufactured and used by or for the Government for governmental purposes without the payment of any royalties thereon or therefore.

BACKGROUND OF THE INVENTION

1. Field of the Invention

This invention relates to fabricating dielectric materials. More specifically, the invention is method for fabricating barium titanate-based dielectric materials having high permittivity and low dielectric loss with high energy density.

2. Description of the Related Art

Increasing the amount of power, and the length of time a battery can supply power for a load, is a constant challenge. For example, air and space missions continually dictate the need for more power as missions lengthen in time and complexity. Currently, electrochemical batteries are the primary power source for avionics and their subsystems. Current state-of-the-art electrochemical rechargeable batteries cannot be rapidly charged, contain harmful chemicals, and have fairly limited life spans. A positive advancement in this art would involve the replacement of heavier/larger electrochemical batteries with lighter, safer, and more efficient energy-storage devices.

Solid-state ultracapacitors are recyclable energy-storage devices that have shown promise in terms of increased power and number of charging cycles as compared to electrochemical batteries. Unfortunately, current solid-state ultracapacitors do not possess sufficient permittivity and energy density to justify their use as a replacement for electrochemical batteries.

SUMMARY OF THE INVENTION

Accordingly, it is an object of the present invention to provide a method of fabricating high-permittivity dielectric materials for use in ultracapacitors.

Another object of the present invention is to provide a method of fabricating dielectric materials for use in solid-state ultracapacitors such that the fabricated material exhibits a high-permittivity and high energy density.

Other objects and advantages of the present invention will become more obvious hereinafter in the specification and drawings.

In accordance with the present invention, a method of fabricating a high-permittivity dielectric material includes the step of heating nano-sized particles of barium-titanate as a gas mixture of 25% hydrogen and 75% nitrogen is passed there through yielding particles of barium-titanate having oxygen vacancies therein. The particles of barium-titanate having oxygen vacancies therein are then coated with silica yielding silica-coated particles having a silica coating thickness in a range of 2-5 nanometers. The silica-coated particles are sintered by application of pressure in a range of 35-50 megapascals and temperature in a range of 950-1050° C. The sintered quantity of material is cooled at a cooling rate in a range of 1-3° C. per minute at least until the temperature thereof is less than 120° C.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
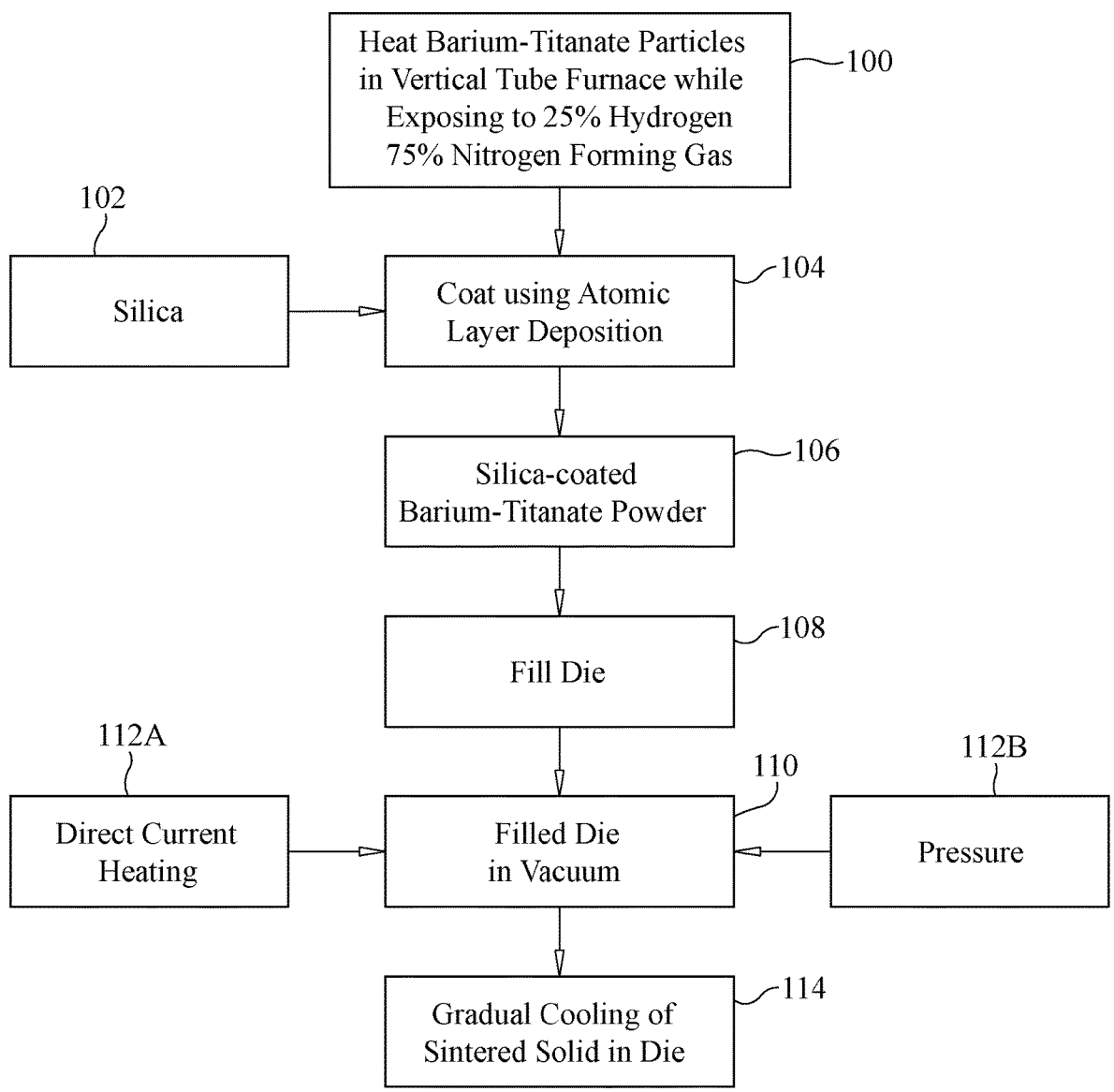
FIG. 1 is a schematic view of a method of fabricating a high-permittivity dielectric material in accordance with an embodiment of the present invention.

Referring now to the drawings and more particularly to FIG. 1, steps in a fabrication process are shown that yield a high-permittivity dielectric material in accordance with an embodiment of the present invention. As will be explained further below, the resulting material possesses characteristics and specifications that will allow it to be used in solid-state ultracapacitor energy-storage devices whose performance will match or exceed that of comparable electrochemical batteries. Accordingly, dielectric materials made in accordance with the present invention can become the building block for solid-state ultracapacitors for use in the next generation of energy-storage devices.

The constituent elements used to make the material in accordance with the present invention are nano-sized particles of barium-titanate and silicon dioxide or silica as it will be referred to hereinafter. For purposes of the present invention, nano-sized barium-titanate particles are defined as particles having diameters in the range of approximately 20 nanometers to approximately 200 nanometers. Such nano-sized particles are also referred to in the art as powders.

The barium-titanate used in the present invention undergoes novel pre-processing to create oxygen vacancies throughout each particle where the oxygen vacancies provide for electron movement in the presence of an electric field that contributes to the high permittivity material fabricated in accordance with the method of the present invention. The barium-titanate (powder) particles of appropriate size can be obtained commercially or milled from larger particles. If milling is required, an exemplary milling process begins by placing barium-titanate particles in a micromill (e.g., a Fritsch P7 micromill) along with 2 millimeter zirconia media balls and ethanol. Each of forty 3-minute milling cycles at 950 RPM is followed by a 10 minute pauses to allow cooling prior to the next cycle. After milling, the zirconia media is separated from the milled barium-titanate powder with a sieve, and any remaining ethanol is evaporated. A final light grinding with a mortar and pestle process can be performed to eliminate any remaining agglomeration of the milled powder.

Figure 2:
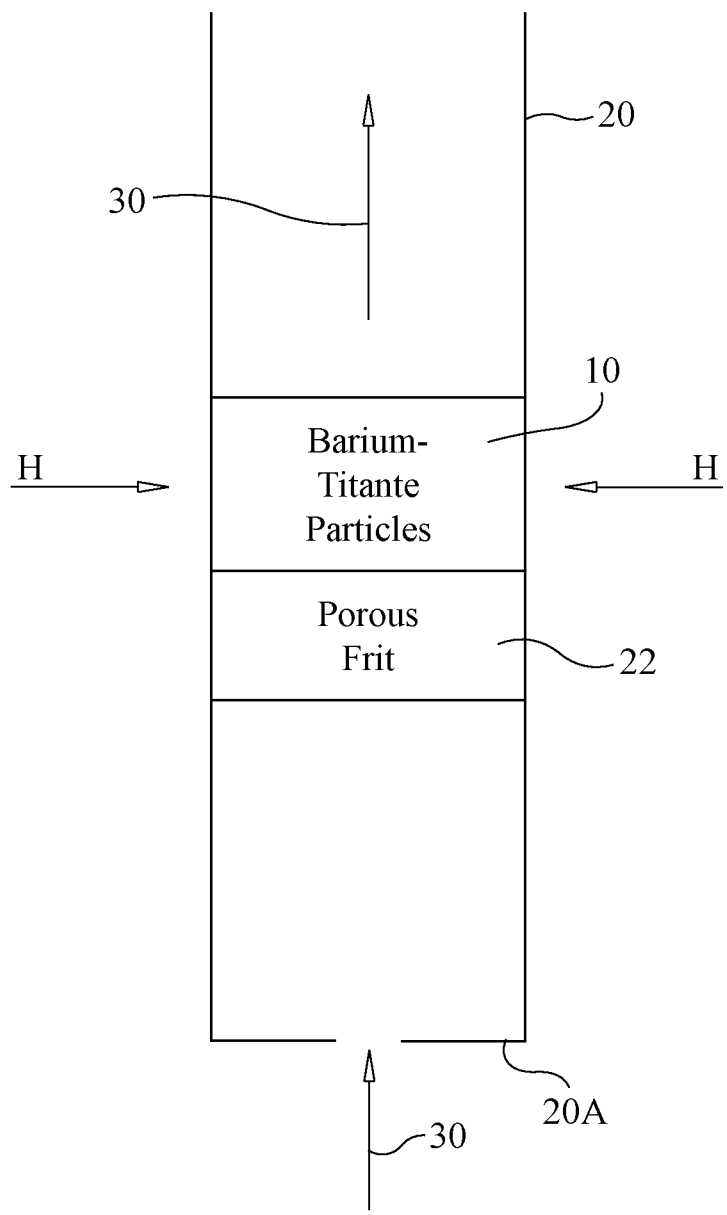
FIG. 2 is a schematic view of a vertical tube furnace for pre-processing barium titanate particles in accordance with an embodiment of the present invention.
Figure 3:
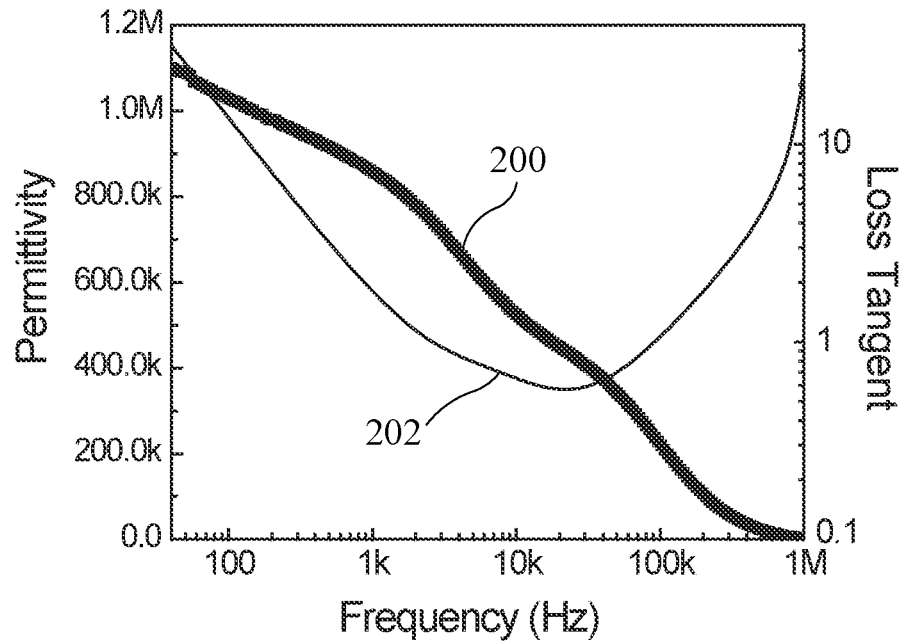
FIG. 3 is a plot of permittivity and loss tangent as a function of frequency for a first material sample fabricated in accordance with the present invention.
Figure 4:
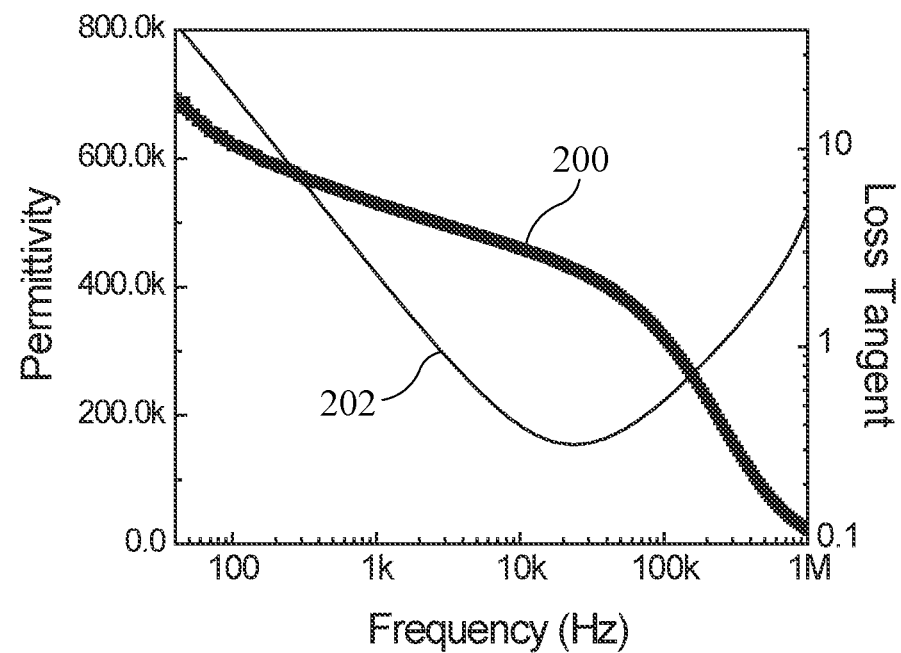
FIG. 4 is a plot of permittivity and loss tangent as a function of frequency for a second material sample fabricated in accordance with the present invention.
Figure 5:
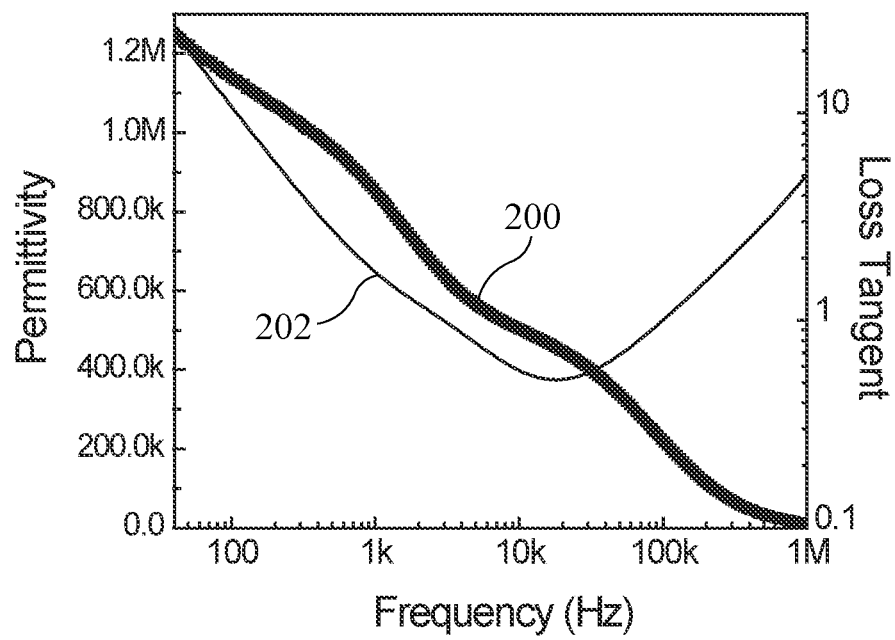
FIG. 5 is a plot of permittivity and loss tangent as a function of frequency for a third material sample fabricated in accordance with the present invention.
Figure 6:
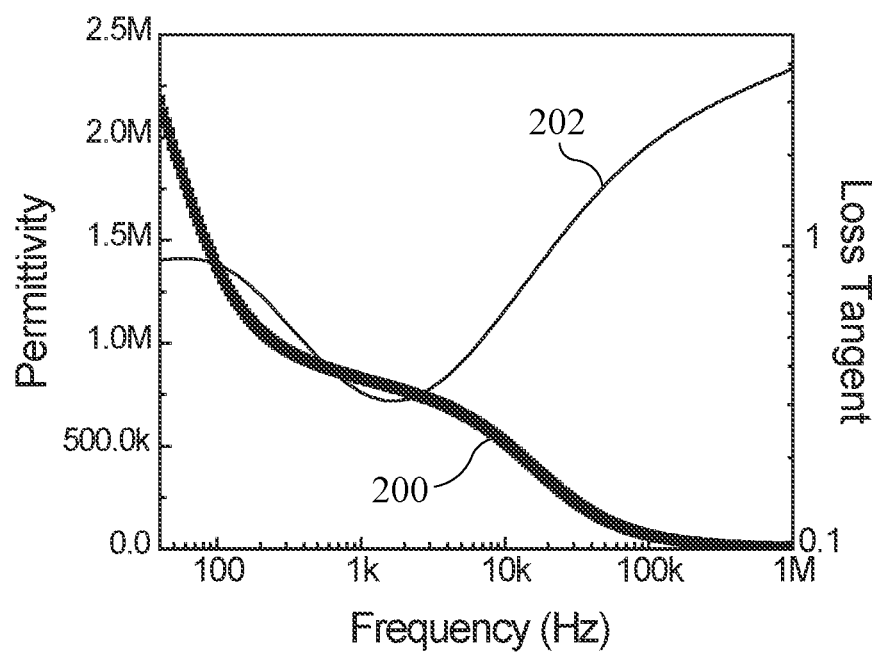
FIG. 6 is a plot of permittivity and loss tangent as a function of frequency for a fourth material sample fabricated in accordance with the present invention.
Figure 7:
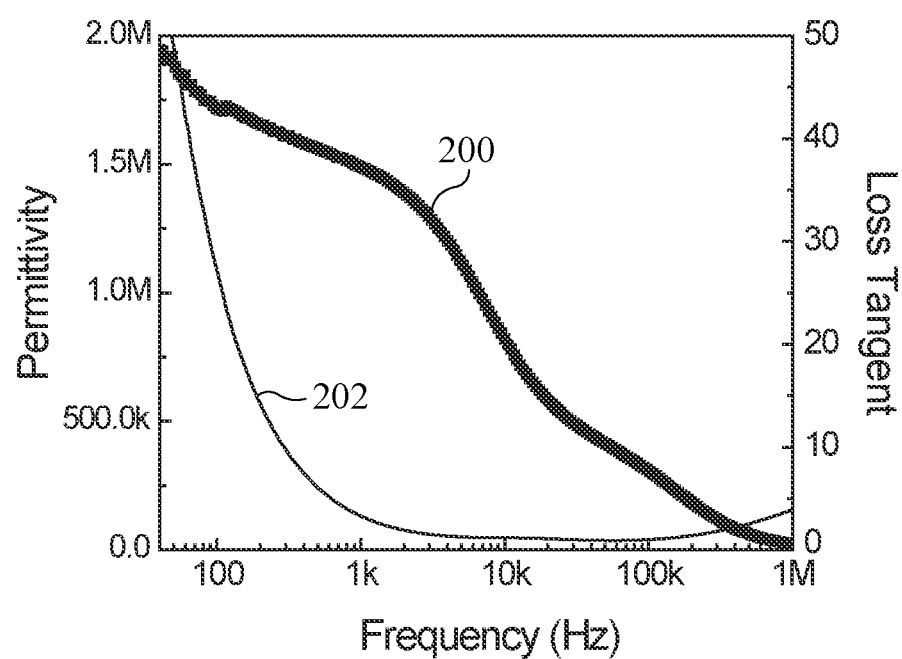
FIG. 7 is a plot of permittivity and loss tangent as a function of frequency for a fifth material sample fabricated in accordance with the present invention.

Whether obtained commercially or milled, the appropriately-sized barium-titanate particles are pre-processed at step 100 to create the above-mentioned oxygen vacancies. In general and with reference to FIG. 2, the obtained or milled barium-titanate particles 10 are placed in a vertical-tube furnace 20 and heated as a forming gas (indicated by arrow 30) is flowed into furnace 20 and through barium-titanate particles 10. More specifically, a quantity of particles 10 are placed on a porous glass frit 22 disposed in furnace 20. A flow of forming gas 30 is introduced into an opening in furnace 20 at its bottom end 20A thereof while particles 10 are at ambient (e.g., room) temperature. For purposes of generating sufficient oxygen vacancies in particles 10 that will ultimately contribute to a high permittivity material, forming gas 30 is a gas mixture of 25% hydrogen and 75% nitrogen. The flow rate of forming gas 30 is selected to create some fluidized movement of particles 10 within furnace 20 as forming gas 30 passes through particles 10. By way of an illustrative example, when furnace 20 is a 3-inch diameter tube furnace and 35-40 grams of particles 10 are disposed on glass frit 22 having a porosity of 10-15 micrometers, a flow of forming gas 30 in a range of 1.0 to 1.5 cubic feet per hour (SCFH) created fluidized movement of particles 10.

After forming gas 30 is introduced into furnace 20 at ambient temperature, heat "H" is applied to furnace 20. In the present invention, furnace 20 and particles 10 are gradually heated to 900° C. over a period of approximately 45 minutes. The 900° C. temperature is held steady for approximately 60 minutes. Heat H is then removed and furnace 20 with particles 10 therein are allowed to cool to ambient temperature. Particles 10 are then removed from furnace 20.

At a coating process step 104, silica 102 is used to coat the barium-titanate particles processed as described in step 100 using the vapor deposition technique known as atomic layer deposition. For purposes of the present invention, step 104 is carried out to achieve a solid silica coating thickness targeted to be in the range of 2-5 nanometers on the nano-sized particles of barium-titanate. The resulting silica-coated barium-titanate powder 106 is next processed to form a solid.

Powder 106 is used to fill a die at step 108 where the shape and size of the die are not limitations of the present invention. The die can be made from a variety of materials to include graphite. Graphite is typically used as a die material owing to a number of attributes to include high thermal conductivity, durability, good material release properties, and its generally inert relationship with respect to most materials.

The filled die is placed in a vacuum at step 110. Heating in a vacuum ensures additional creation of oxygen vacancies resulting in additional free electrons and increased permittivity. The silica-coated barium-titanate powder is then simultaneously subjected to increase in temperature and pressure at steps 112A and 112B, respectively, to thereby sinter the silica-coated barium-titanate powder into a solid form thereof. More specifically, heating step 112A is accomplished by continuous application of a DC electric current to the die in order to raise the temperature of the silica-coated barium-titanate powder (i.e., starting out at room temperature) to a temperature in the range of 950-1050° C. The continuous application of a DC current ensures maintenance of a stable temperature profile throughout the heating process. Measurement of temperature can be accomplished in a variety of ways (e.g., using a thermocouple, optical pyrometer, etc.) without departing from the scope of the present invention. The applied DC current is controlled such that heating follows a ramping function in a range of 50-100° C. per minute. The simultaneous application of pressure step 112B also follows a ramping function to achieve a pressure in the range of 35-50 megapascals (MPa). A pressure ramping function of approximately 10 MPa per minute can be used. Once the target temperature and pressure are achieved, the combination is maintained for approximately 5 minutes to assure complete sintering of the powder in the die.

At the completion of the above-described sintering process, the electric current is turned off and the pressure is released. The sintered or solid form of silica-coated barium-titanate is gradually cooled at step 114. More specifically, the solid material is passively cooled in the die in accordance with a cooling ramping function in a range of 1-3° C. per minute at least until the temperature of the solid is at or below 120° C. The gradual cooling through the 120° C. temperature minimizes the effects of a structural transformation in the sintered solid that could cause a macro break-up of the sintered solid.

Numerous samples fabricated in accordance with the present invention were tested with the results for five samples being indicated in the table below for the nominal testing frequency of 1 kHz. Broadband performance characteristics of the fabricated materials are presented in the corresponding plots of permittivity and loss tangent as a function of frequency are illustrated for samples 1-5 in FIG. 3-7, respectively. Particle sizes of the barium-titanate for all samples were approximately 140 nanometers. A silica coating thickness of 5 nanometers was targeted for each sample.

Each silica-coated barium-titanate sample was heated in a die using a continuously-applied DC current in the following three-phase process:

heating at a rate of 100° C. per minute until the sample reached 950° C.;

holding the temperature at 950° C. for 2 minutes; and heating at a rate or 50° C. per minute until the sample reached 1050° C.

Simultaneous with heating of the sample, the pressure applied to the filled die followed the following three-phase process:

pressure applied at a rate of 10 MPa per minute until the pressure reached 35 MPa;

holding pressure at 35 MPa until completion of 2 minutes of temperature hold at 950° C.; and pressure applied at a rate of 10 MPa per minute until the pressure reached 50 MPa.

Once each sample attained the temperature/pressure combination of 1050° C./50 MPa, each sample was held at this temperature/pressure combination for 5 minutes. At the conclusion of 5 minutes, the direct current was removed and the pressure was released to 0 MPa. Each sample was allowed to cool at a rate of 1-3° C. down to at least 120° C.

in order to avoid sample fracturing. Each sample was removed from its die upon reaching room temperature.

| Sample | Permittivity @ 1 kHz | Loss Tangent @ 1 kHz |
|--------|----------------------|----------------------|
| 1      | 856,536              | 1.777                |
| 2      | 529,577              | 2.294                |
| 3      | 846,779              | 1.691                |
| 4      | 827,393              | 0.327                |
| 5      | 1,487,486            | 3.222                |

As is evident from the results, the smallest permittivity was in excess of 500,000, while the largest permittivity was nearly 1.5 million. The semiconducting barium-titanate particles in the sintered solid are separated by thin regions of silica such that electric charge can move easily within the barium-titanate particles, while the regions of silica store the electric charge.

All samples were fabricated the same way. However, variations in coating thickness resulted in corresponding variations in permittivity since samples having a greater coating thickness (i.e., greater than the target 5 nanometer thickness) reduce permittivity and increase the loss tangent. The corresponding plots of permittivity and loss tangent for each of samples 1-5 are shown in FIGS. 3-7, respectively, where curve 200 in each figure is a plot of permittivity as a function of frequency, and curve 202 in each figure is a plot of loss tangent as a function of frequency.

The advantages of the present invention are numerous. A novel barium-titanate pre-processing step introduces oxygen vacancies in the barium-titanate particles. As it relates to charge carrying, a vacancy carries some charge (i.e., an electron). The electron is not free, but is also not bonded to an atom as normal chemical bonds. That is, the electron can move over the area of the vacancy which is a relatively large area. When an electric field is applied to this type of barium-titanate particle, the electron will move under the electric field. If the electric field is an alternating current (AC) field, the electron moves back and forth similar to an electric dipole whose dipole moment changes with the external electric field. It is this electron movement that contributes to the ultimate high permittivity material yielded by the process of the present invention.

The fabrication method yields solid-state dielectric materials that can be used to construct solid-state ultracapacitor energy-storage devices. The materials exhibit high permittivity that is indicative of a high energy density through capacitance. The low loss tangent results are indicative of low losses of stored electric charges. Given that the maximum permittivity of barium-titanate is on the order of 10,000, the method of the present invention will substantially advance the art solid-state ultracapacitors.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of fabricating a high-permittivity dielectric material, comprising steps of:
   heating nano-sized particles of barium-titanate as a gas mixture of 25% hydrogen and 75% nitrogen is passed there through yielding particles of barium-titanate having oxygen vacancies therein;
   coating said particles of barium-titanate having oxygen vacancies therein with silica yielding silica-coated particles having a silica coating thickness in a range of 2-5 nanometers;
   sintering a quantity of said silica-coated particles by a continuous application of a DC electric current to said silica-coated particles to heat said silica-coated particles to a temperature in a range of 950-1050° C., said step of sintering further including a simultaneous application of pressure in a range of 35-50 megapascals; and
   cooling said quantity so-sintered to minimize macro-level breaking of said quantity so-sintered, wherein said step of cooling is carried out at a cooling rate in a range of 1-3° C. per minute at least until a temperature of said quantity so-sintered is less than 120° C., wherein a dielectric material having a permittivity of at least 500,000 at a frequency of 1 kHz is fabricated.

2. A method according to claim 1, wherein said step of coating comprises atomic layer deposition of said silica.

3. A method according to claim 1, wherein said step of sintering takes place in a vacuum.

4. A method according to claim 1, wherein said step of sintering includes a step of increasing said pressure in accordance with a pressure ramping function.

5. A method according to claim 1, wherein said step of sintering includes a step of increasing said temperature in accordance with a temperature ramping function.

6. A method according to claim 1, wherein said step of sintering includes a step of maintaining said quantity of said silica-coated particles at said pressure and said temperature for approximately 5 minutes.

7. A method according to claim 1, wherein said step of heating comprises the steps of:
   placing said nano-sized particles of barium-titanate in a vertical-tube furnace;
   introducing said gas mixture into said vertical-tube furnace at a flow rate sufficient to cause fluidized movement of said nano-sized barium-titanate particles; and
   applying heat to said vertical-tube furnace to raise a temperature of said nano-sized barium-titanate particles to 900° C. for approximately 60 minutes.

8. A method according to claim 7, further comprising a step of cooling said particles of barium-titanate having oxygen vacancies therein to an ambient temperature prior to said step of coating.

9. A method of fabricating a high-permittivity dielectric material, comprising ire steps of:
   heating, in a vertical-tube furnace, particles of barium-titanate having diameters not to exceed 200 nanometers as a gas mixture of 25% hydrogen and 75% nitrogen is passed there through, wherein particles of barium-titanate having oxygen vacancies therein are generated;
   coating, using atomic layer deposition, said particles of barium-titanate having oxygen vacancies therein with silica yielding silica-coated particles having a silica coating thickness in a range of 2-5 nanometers;
   sintering, in a vacuum, a quantity of said silica-coated particles by a continuous application of a DC electric current to said silica-coated particles to heat said silica-coated particles to a temperature in a range of 950-1050° C., said step of sintering further including a simultaneous application of pressure in a range of 35-50 megapascals;
   discontinuing, following said step of sintering, said continuous application of said DC electric current and said simultaneous application of pressure; and cooling said quantity so-sintered to minimize macro-level breaking of said quantity so-sintered, wherein said step of cooling is carried out at a cooling rate in a range of 1-3° C. per minute at least until a temperature of said quantity so-sintered is less than 120° C., wherein a dielectric material having a permittivity of at least 500,000 at a frequency of 1 kHz is fabricated.

10. A method according to claim 9, wherein said step of sintering includes a step of increasing said pressure in accordance with a pressure ramping function.

11. A method according to claim 9, wherein said step of sintering includes a step of increasing said temperature in accordance with a temperature ramping function.

12. A method according to claim 9, wherein said step of heating includes the steps of:
introducing said gas mixture into said vertical-tube furnace at a flow rate sufficient to cause fluidized movement of said barium-titanate particles; and
applying heat to said vertical-tube furnace to raise a temperature of said barium-titanate particles to 900° C. for approximately 60 minutes.

13. A method according to claim 12, further comprising a step of cooling said particles of barium-titanate having oxygen vacancies therein to an ambient temperature prior to said step of coating.

14. A method of fabricating a high-permittivity dielectric material, comprising steps of:
heating, in a vertical-tube furnace, particles of barium-titanate having diameters not to exceed 200 nanometers as a gas mixture of 25% hydrogen and 75% nitrogen is passed there through, wherein particles of barium-titanate having oxygen vacancies therein are generated;
coating, using atomic layer deposition, said particles of barium titanate having oxygen vacancies therein with silica yielding silica-coated particles having a silica coating thickness in a range of 2-5 nanometers;
placing a quantity of said silica-coated particles in a die;
placing said die in a vacuum;
increasing pressure on said die to achieve a sintering pressure on said quantity of said silica-coated particles in said die of 50 megapascals;
continuously applying, simultaneously with said step of increasing, a DC electric current to said die to achieve a sintering temperature of said quantity of said silica-coated particles in said die of 1050° C.;
maintaining said sintering pressure and said sintering temperature for approximately 5 minutes wherein said quantity of said silica-coated particles in said die are transformed to a sintered solid;
discontinuing said steps of increasing pressure and continuously applying; and
cooling said sintered solid in said die to minimize macro-level breaking of said sintered solid, wherein said step of cooling is carried out at a cooling rate in a range of 1-3° C. per minute at least until a temperature of said sintered solid is less than 120° C., wherein a dielectric material having a permittivity of at least 500,000 at a frequency of 1 kHz is fabricated.

15. A method according to claim 14, wherein said step of increasing includes a step of increasing said sintering pressure on said die in accordance with a pressure ramping function.

16. A method according to claim 14, wherein said step of applying includes a step of increasing said sintering temperature in accordance with a temperature ramping function.

17. A method according to claim 14, wherein said step of heating includes the steps of:
introducing said gas mixture into said vertical-tube furnace at a flow rate sufficient to cause fluidized movement of said barium-titanate particles; and
applying heat to said vertical-tube furnace to raise a temperature of said barium-titanate particles to 900° C. for approximately 60 minutes.

18. A method according to claim 17, further comprising a step of cooling said particles of barium-titanate having oxygen vacancies therein to an ambient temperature prior to said step of coating.

* * * * *